A. D. ELLSWORTH.
WAGON.
APPLICATION FILED FEB. 21, 1910.
970,436.
Patented Sept. 13, 1910.
2 SHEETS—SHEET 1.
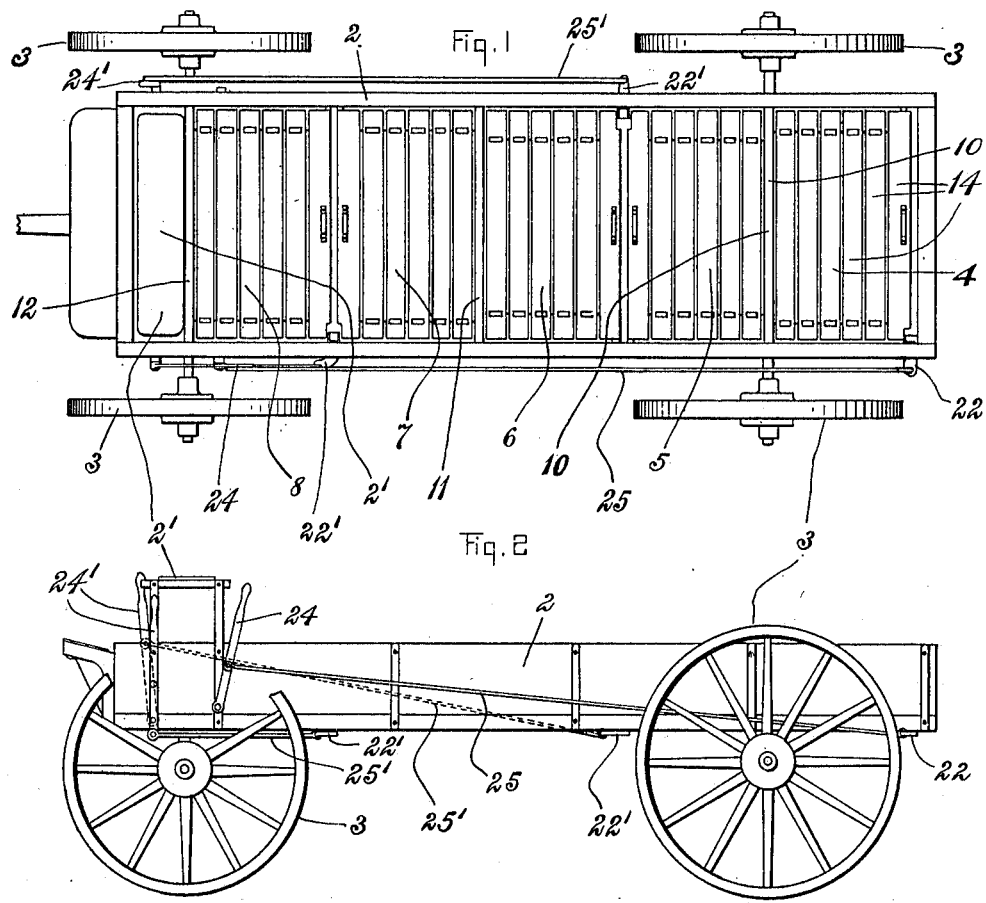
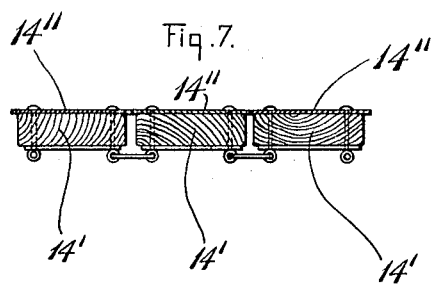
Witnesses.
C. D. Anderson
H. O. Foss
Inventor:
Albert D. Ellsworth
Att'ys, Sutherland & Anderson

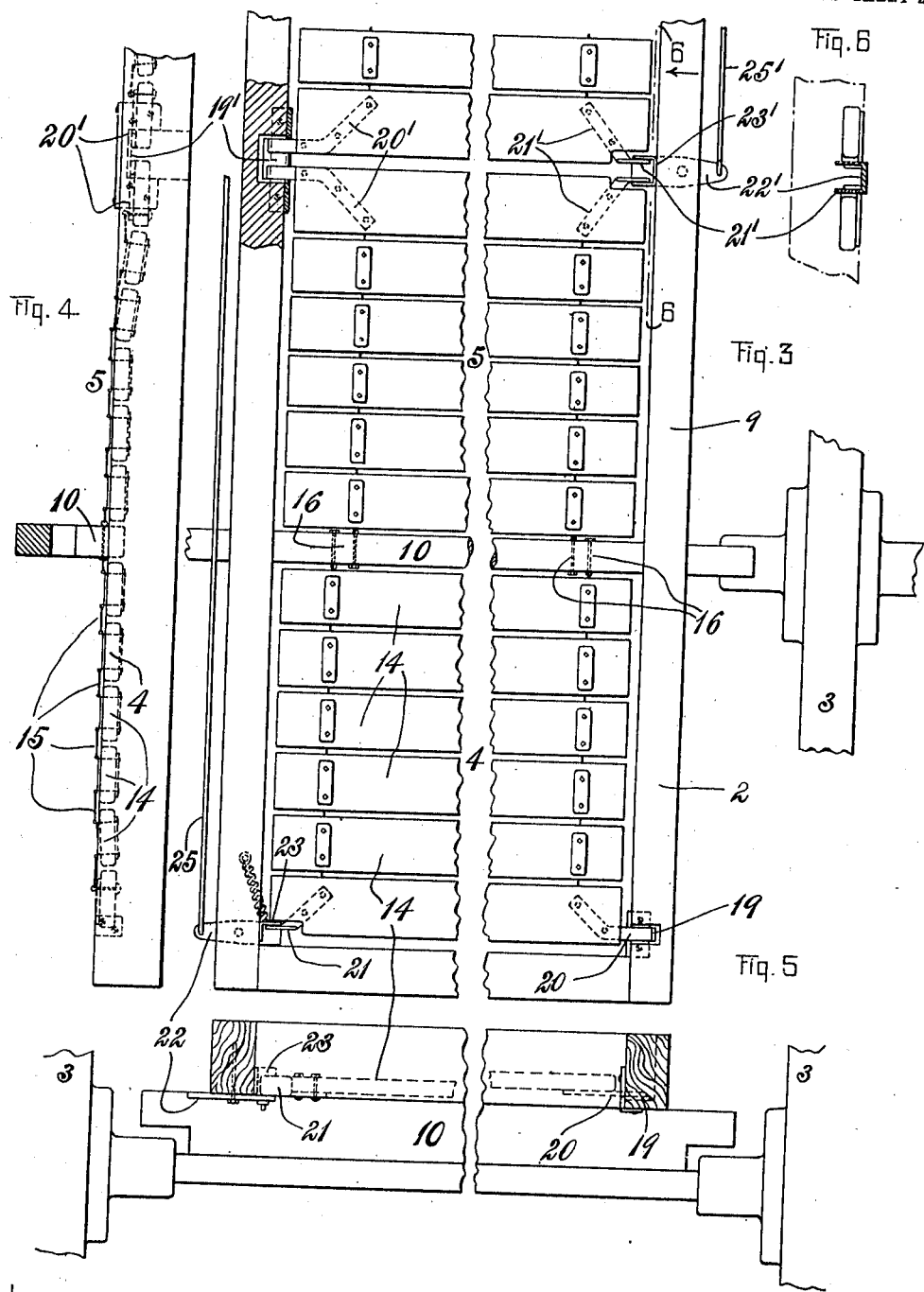

UNITED STATES PATENT OFFICE.

ALBERT D. ELLSWORTH, OF BROAD BROOK, CONNECTICUT.

WAGON.

970,436.  Specification of Letters Patent.  Patented Sept. 13, 1910.

Application filed February 21, 1910. Serial No. 545,248.

*To all whom it may concern:*

Be it known that I, ALBERT D. ELLSWORTH, a citizen of the United States, residing at Broad Brook, in the county of Hartford and State of Connecticut, have invented certain new and useful Improvements in Wagons, of which the following is a specification.

This invention relates to wagons and I desire it to be understood that I employ this term in a generic sense to include analogous devices such as vehicles of various types.

A wagon involving my invention comprises a drop-down bottom and it is one of the objects of the invention to provide a bottom which is self-cleaning or self-clearing whether said bottom be of sectional form as I prefer to have it or otherwise. This result I secure in the present case by making the bottom of flexible nature.

Another object is the provision of simple and effective means for holding the bottom in a load-receiving condition.

The invention possesses other features of novelty and advantage which with the foregoing will be set forth at length in the following description where I shall outline in detail that form of embodiment of the invention which I have selected for illustration in the drawings accompanying and forming part of the present specification. From this it will be evident that I do not restrict myself to the disclosure made by said drawings and description for many changes therefrom may be made within the scope of my invention as expressed in the claims succeeding said description, the specific disclosure in question being provided to enable those skilled in the vehicle art to practice the invention.

Referring to the drawings, Figure 1 is a top plan view of a wagon including my invention. Fig. 2 is a side elevation of said wagon. Fig. 3 is a top plan view of the outer portion of the body and associated parts, a portion of the framework being in section. Fig. 4 is a side elevation of the parts shown in Fig. 3. Fig. 5 is a transverse section of Figs. 3 and 4. Fig. 6 is a detail section view, the section being on the line 6—6 of Fig. 3, and, Fig. 7 is a like view of a modified form of bottom.

The several views are on different scales and throughout the same like characters refer to like parts.

As will be gathered from the observations already made my invention can be employed with advantage in many different connections but in Figs. 1 to 6 inclusive I have shown the same incorporated in a farm-wagon which is primarily intended for hauling manure said wagon being shown practically in full in Figs. 1 and 2, and comprising the usual body 2 which may be mounted on any suitable running gear equipped with wheels as 3. The invention primarily resides in the bottom of said body 2 which is preferably but not necessarily of sectional formation, being shown as composed of several doors or drop-down sections five of which are shown but which number as will be clear is not material for it is conceivable that but one section or door might be employed, the door itself being of novel character. As a matter of convenience these doors will be denoted respectively by 4, 5, 6, 7 and 8 and as will hereinafter appear they can be consecutively or successively released from their closed or operative positions which is a desirable factor when the wagon is used for carrying manure as by such a condition the manure can be more evenly spread over the ground or as it might otherwise be put distributed to better advantage rather than be dumped in a single pile and then spread over the ground.

The frame of the body is denoted in a general way by 9 and it is provided with cross-bars 10, 11 and 12 to which the doors are hinged, and the means for hinging the doors will be hereinafter described. Said doors in the present case move about axes extending transversely of the wagon and when closed as indicated in Fig. 4 they are horizontally alined as nearly as their flexible nature will permit so as to present at such time practically a continuous bottom. As the doors are practically all alike a detailed description of one, for instance the door 4, will suffice for the others and in this connection reference should be had particularly to Figs. 3 and 4. Said door is shown composed of several strips or slats 14 connected flexibly together in any desirable manner, for example by links 15. These strips are arranged in parallelism and they are shown separated or spaced apart in both Figs. 1 and 4 but this is not a matter of consequence as there may be cases where I should desire to have them fit edge to edge. In Fig. 7 I illustrate a slight modification wherein the slats or strips 14' are separated but the gaps between the same are closed by plates 14″ connected to the upper sides of the respective slats and adapted to cover said gaps so as to prevent the passage of material through said gaps or openings. I find, however, the relation shown in Figs. 1 and 4 as best suited to handling such substances as animal manure. Said doors or drop down sections are hinged to the several hereinbefore described cross bars in any desirable manner, for example by hinges each denoted by 16, and in the present case each of said cross bars supports two of said doors, the cross bar 10 carrying the doors 4 and 5, the cross bar 11, the doors 6 and 7 and the cross bar 12, which is the front one, the door 8, although of course this particular disposition of the parts may be varied.

Means are provided as will hereinafter appear for positively holding the doors shut or substantially in horizontal alinement at which time as will be evident they present a practically continuous bottom for the wagon body or box 2 and while they are in such relation they may be supplied with the load which we will suppose is manure, the sides of the said body or box preventing lateral movement of the load.

When it becomes necessary to unload the wagon the door 4 will be first released and the mass of material on the same will forcibly open said door. The wagon will then be moved forward and the doors 5 and 6 will be successively released by the shifting of a member common to them both so that both of said doors can be opened practically together. The wagon will be then advanced when the same operation will be repeated with respect to the doors 7 and 8 and owing to this successive releasing and opening of the doors the manure can be distributed to much better advantage than if it were dumped on the ground in one pile. The doors when opened owing to their flexible nature curl or double or bend on themselves and in view of this action they are practically self-cleaning and this function is also aided by the free swing of the doors; that is there will be somewhat of a flapping motion so that I insure their complete discharge of the mass thereon. The fact also that the slats or strips making up the doors are separated is also advantageous in that there are no small crevices in which the material can collect.

I provide in connection with each door or drop down section and preferably at or near the free edge thereof two devices, one a relatively permanent or fixed detent and the other a shiftable detent or latch and these two parts for sake of clearness will be described in connection with the door 4 this description applying to the remaining doors except in the particular hereinafter mentioned.

Referring now particularly to Fig. 3 a fixed or permanent detent such as answers satisfactorily my purpose is that denoted by 19 and this detent may consist of a catch-plate or keeper set into a mortise or rebbet in the inner face of the adjacent sidebar of the frame 9, said keeper or plate being adapted to be engaged by a projection as 20 which may consists of an angular bar the shank of which is fastened to the underside of the door 4 near one side or front corner thereof, said shank in the present case being fastened to the outermost slat of said door. Said projection 20 as will be clear extends laterally from the door and it is adapted when in operative position to overlie the plate 19 which as will be understood is stationary on the frame 9. The door 4 is provided at its opposite side or front corner with a second projection 21 the shank of which is also fastened to the under side of said outermost slat said projection 21 being adapted to engage a detent or latch 22 of pivoted type and shown as supported for swinging movement between its ends, by the side bar of the frame 9, adjacent said projection 21, said projection 21 in the present case being adapted to engage the inner arm or branch of said latch or detent 22. The side bar of the frame 9 which supports said lever or latch 22 is shown equipped with a bracket 23 on its inner face, said bracket being of angular form and the inner branch thereof extending transversely of the frame 9 and being coöperative with the outer or tail cross bar of said frame, to prevent the projection 21 from accidentally slipping off the inner or working arm of the latch 22; that is to say when the said latch is in its operative position lateral motion of the projection 21 will not be possible.

It is assumed in Fig. 3 that the door 4 is held closed by the joint action of the detent 19 and detent 22. To open said door the latch or detent 22 is operated to carry its inner branch from under the projection or offset 21 at which time the weight of the material on said door will force the latter open, the flexibility of the door causing the projection 20 to tip up and then ride off the coöperating keeper 19.

Any suitable means may be provided for operating or tripping the latch 22 to effect the release of the door and the means shown for this purpose will now be described. To the outer arm of said latch 22 the rod 25 is shown jointed said rod extending forward from the latch and being jointed at its forward end to the manually-operable lever 24 pivoted at its butt to the body 2 and the handle of which is preferably within reach of the driver occupying the seat 2′.

As I have already intimated the several doors are held closed by substantially the same mechanism although as will now appear detent means for the doors 5, 6, 7 and 8 coöperates respectively with said doors in pairs, that is to say there are two detents coöperative with each pair of doors one of which is stationary and the other shiftable.

The doors 5, 6, 7 and 8 are provided respectively at their meeting or free edges with projections 20' practically the equivalent of the projection 20, and each pair of projections 20' is adapted to overlie a plate or keeper 19' set into the adjacent side bar of the frame 9. Said four doors are provided with projections 21' the equivalents of the projection 21 already described, which are adapted in pairs to overlie the inner arms of the latches or detents 22' the equivalents of the latch 22 already described. The free ends of the projections 21' as shown best in Fig. 3 when the levers or latches 22' are in their effective positions are located between the sides of the U-shaped members 23' which sides prevent lateral motion of said projections 21' to thereby prevent accidental opening of said doors 5, 6, 7 and 8. To the outer arms of the latches 22' the rods 25' are jointed, said rods extending forward and being connected to levers 24' counterparts of the lever 24, one of the levers being mounted on one side of the body and the other two being mounted at the opposite sides of said body.

In operation the doors 4, 5, 6, 7 and 8 will be closed at which time the vehicle will be loaded and when loaded will be drawn to the point where it is desired to distribute the contents thereof. The door 4 will be first opened as already described, after which the doors 5, 6, 7 and 8 will be opened in succession, the three hand levers 24, and 24' being utilized to secure this result.

It should be explained although it is believed that it will be understood that the inner arm of the latch 22' will be first moved forward from its central or intermediate position to free the door 5 and will then be moved rearward from said central position to release the door 6, the same operation being subsequently repeated with the second latch 22' to effect consecutively the release of the doors 7 and 8.

What I claim is:

1. A wagon having a swinging, flexible drop down section, and means for normally holding the section closed, the latter when released being openable by the weight of the mass sustained thereon and being capable as it swings down of curling on itself thereby to make the same self-clearing.

2. A wagon the bottom of which is composed of a plurality of independent drop down swinging sections each composed of a plurality of flexibly connected slats, and means for normally holding the sections closed to present substantially a continuous bottom.

3. A wagon having a bottom comprising a plurality of flexible drop down sections, each having lateral projections, fixed and movable detents supported independently of the sections and engageable by the respective projections, the movable projections when shifted being adapted to release the sections whereby the latter may be opened by the weight of the mass supported thereon, and said sections being capable of curling on themselves as they open.

In testimony whereof I affix my signature in presence of two witnesses.

ALBERT D. ELLSWORTH.

Witnesses:
F. E. ANDERSON,
HEATH SUTHERLAND.